3,058,911
LUBRICATING COMPOSITION

Alfred H. Matuszak, Westfield, and Stephen J. Metro, Scotch Plains, N.J., assignors to Esso Research and Engineering Company, a corporation of Delaware
No Drawing. Filed Nov. 26, 1958, Ser. No. 776,440
6 Claims. (Cl. 252—49.6)

This invention relates to the reaction product of a synthetic ester and an organic compound of silicon containing a halogen atom or a hydroxyl group. The invention also relates to synthetic ester lubricating oil compositions improved in their load-carrying ability by a minor amount of the reaction product of an organic silicon compound having a reactive halogen or hydroxy radical with a portion of the ester lubricating oil.

There is a continuing need for lubricants and lubricant additives which are stable at elevated temperatures, which have high load-carrying ability and which are also operable at extremely low temperatures. Recently certain synthetic ester oils have come into commercial use as lubricants, particularly for the lubrication of jet and turbojet aircraft which are subjected to wide extremes of temperatures. However, these ester oils, when blended to provide good low and high temperature properties, do not have the desired load-carrying ability. Various load-carrying additives have been proposed for the ester oils. Thus, high molecular weight silicone polymers have been suggested as load-carrying agents for the ester lubricating oils. However, in spite of the fact that very low concentrations of polysilicones inhibit foaming, when these same types of polysilicones are used in amounts sufficient to impart load-carrying ability (e.g. 4%), undesirable foaming generally results at the elevated temperatures at which the oil is used. Also, various organic silicon compounds containing a halogen atom have been suggested as oil improving agents. These silicon-and-halogen containing compounds have been found to impart load-carrying ability, but are extremely corrosive to metal, thereby prohibiting their practical use in non-corrosive lubricating compositions.

It has now been found that a valuable load-carrying improving agent may be prepared by the reaction of an organic silicon compound containing at least one reactive halogen atom (such as chlorine) with a synthetic ester lubricating oil. This reaction is preferably carried out at elevated temperatures over an extended period of time. Exactly what reaction product is formed is not known, although the evolution of a hydrogen-halogen gas shows that a reaction is occurring between the ester lubricant and the silicon compound. This reaction results in removing some of the halogen from the reaction mass and what halogen remains is subsequently removed by alkali washing. Thus, the finished product does not contain any appreciable amounts of halogen and thereby avoids the corrosiveness of the silicon-halogen compounds noted above. At the same time, silicon is incorporated into the ester oil, thereby increasing its load-carrying ability. The resulting product, when used in ester oil, avoids the foaming characteristics of polysilicone-ester oil mixtures mentioned above and is less expensive than using a polysilicone per se as a lubricant or as a lubricating oil component. Similar reaction products can be obtained by using hydroxy-silicon compounds in place of the halogen-silicon compound. In this case, the need for alkali washing is avoided.

Another advantage of the present invention is that by carefully selecting the ester lubricating oil which is known to have the desired properties for a given application, the oil may be further improved with regard to its load-carrying ability by reaction with silicon compounds as outlined above, without interfering with its other desirable properties. Furthermore, the incorporation of silicon into the synthetic oil will improve the overall viscosity-temperature characteristics of the oil.

The silicon compounds operable in the present invention will have the general formula:

wherein X represents a hydroxy group or a halogen such as chlorine, or bromine; and R may also be the same as X, or may represent a hydrocarbon radical, either straight or branched chain aliphatic, aromatic or alicyclic, e.g. alkyl, aryl, alkaryl or cycloalkyl groups. Each R group may contain 1 to 15, preferably 1 to 6 carbon atoms. Preferred materials are those in which the hydrocarbon group is of rather low molecular weight, e.g. $C_1$ to $C_6$ alkyl groups such as methyl, ethyl, propyl, isopropyl, etc. since the weight of silicon is proportionally higher in these latter materials. Compounds of the above types may be characterized further as:

$R_3SiX$, such as trimethyl monochloro silane, triphenyl monobromo silane, tri(n-butyl) monochloro silane;

$R_2SiX_2$, such as dimethyl dichloro silane, dimethyl monochloro monobromo silane, dimethyl dihydroxyl silane;

$RSiX_3$ such as isooctyl trichloro silane;

$SiX_4$ such as silicon tetrachloride, dichloro dibromo silane, dichloro dihydroxyl silane, etc.

One preferred type of synthetic ester oil that can be reacted with the silicon compound are the diesters of saturated aliphatic dicarboxylic acids esterified with alcohols. These diesters have the general formula:

$$ROOC—R_1—COOR$$

wherein R represents a straight-chain or branched-chain alkyl radical of an alkanol having about 7 to 13 carbon atoms, $R_1$ is a straight or branched-chain $C_4$ to $C_8$ hydrocarbon radical of a dicarboxylic acid, and the total number of carbon atoms in the molecule is about 20 to 36, preferably 22 to 26. Examples of such diesters include di-2-ethylhexyl sebacate, di-n-nonyl adipate, di-isooctyl azelate, di-isooctyl adipate, di-isodecyl adipate, monoisooctyl mono-isodecyl adipate, di-n-heptyl isosebacate, di-$C_8$ Oxo trimethyl adipate, di-$C_{13}$ Oxo pimelate, etc. The diesters prepared from the Oxo alcohols, which are isomeric mixtures of highly branched-chain aliphatic primary alcohols, are particularly desirable. Thus, the Oxo alcohols have a very high degree of branching in the hydrocarbon chain, which results in diester oils having low pour points and low viscosities at low temperature. These alcohols are prepared from olefins, such as polymers and copolymers of $C_3$ to $C_4$ monoolefins, which are reacted with carbon monoxide in the presence of a cobalt carbonyl catalyst, at temperatures of about 300° to 400° F., and under pressures of about 1000 to to 3000 p.s.i., to form aldehydes. The resulting aldehyde product is then hydrogenated to form the alcohol which is then recovered from the hydrogenation product.

Various so-called complex esters may also be either directly reacted with the silicon material or may be reacted with the silicon material when admixed with the diester. Such complex esters are formed by esterification reactions between a dicarboxylic acid, a glycol, and an alcohol or monocarboxylic acid, a glycol, and an alcohol or monocarboxylic acid and generally contain about 28 to 60 carbon atoms. These esters may be represented by the following formulas:

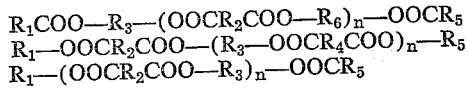

wherein $R_1$ and $R_5$ are alkyl radicals of the monohydric alcohol (e.g. alkanols), or the monocarboxylic acid (e.g. fatty acids), $R_2$ and $R_4$ are hydrocarbon radicals of dicarboxylic acids (e.g. alkanedioic acids), and $R_3$ and $R_6$ are divalent hydrocarbon or hydrocarbon-oxy radicals such as —$CH_2(CH_2)_n$— or —$CH_2CH_2(OCH_2CH_2)_n$— of a glycol or polyalkylene glycol. The value of $n$ will usually range from 1 to 6, and will depend primarily upon the relative molar ratio of the glycol or polyglycol to the dicarboxylic acid. Some specific materials used in preparing the above tyep of complex esters are as follows: Monohydric alcohols having about 4 to 13 carbon atoms such as n-butyl alcohol, 2-ethylbutyl alcohol, n-hexyl alcohol, 2-ethylhexyl alcohol, $C_8$ Oxo alcohol (isooctyl alcohol), and $C_{10}$ Oxo alcohol, etc.; monocarboxylic acids corresponding to said monohydric alcohols; dicarboxylic acids havign 6 to 10 carbon atoms, such as adipic acid, sebacic acid, isosebacic acid, azelaic acid, phthalic acid, etc.; while operable glycols will include ethylene glycols and any of its paraffinic homologues up to 18 carbon atoms such as ethylene glycol, propylene glycol, trimethylene glycol, hexamethylene glycol, etc.; as well as polyethylene glycols containing 2 to 20 ethylene glycol units per molecule and polypropylene glycols containing 2 to 15 propylene glycol units per molecule.

The reaction between the silicon compound and the ester oil is carried out for about 1 to 16 hours, preferably 4 to 8 hours at a temperature of about 40° C. to 165° C., preferably 75 to 125° C. The materials are simply mixed and heated. No catalysts or solvents are required. Generally about 0.5 to 20.0, preferably 1 to 8 moles, of ester will be reacted per mole of silicon material. The reaction product which results should contain 0.001 to 1.0, e.g. 0.01 to 0.5 wt. percent Si. After the reaction is completed, if a halogen-containing silicon compound has been used, it is essential to reduce any residual acidity by alkali washing. Thus the reaction product may be washed with aqueous solutions of a mild alkali such as sodium bicarbonate, water washed and then dried by heating above 212° F. If the silicon reactant contains a hydroxy group and no halogen, then no alkaline washing is required. Rather, the reaction mixture may be directly used without purification.

In place of using elevated temperatures to promote the reaction, the reaction may also be carried out by means of gamma radiation. In this method the reactants are mixed together in the ratios noted above and are subjected to high energy ionizing radiation (e.g. gamma radiation having an incident energy of 1.1 to 1.3 mev. in a dose of about 1.0 to 100.0 megaroentgens from a cobalt 60 source) until the desired conversion is obtained.

The final lubricating composition of the invention may comprise the reaction product per se as a lubricant. However, preferred compositions will comprise a major proportion of synthetic lubricating ester oil and about 0.5 to 10.0 wt. percent, preferably 1 to 6 wt. percent of the silicon-ester oil reaction product. The ester oil used as the base oil may be either a diester or a complex ester oil as previously defined, or mixtures thereof in any proportions.

Various other additives may also be added to the lubricating composition. For example, minor amounts of other types of oils; detergents such as calcium petroleum sulfonate; oxidation inhibitors such as phenyl alpha naphthylamine; viscosity index improvers such as polyisobutylene; corrosion inhibitors such as sorbitan monooleate; pour depressants; dyes; and the like may be added. Various dicarboxylic acids such as $C_6$ to $C_{10}$ acids such as adipic, azelaic, and sebacic may be used in conjunction with the silicon reaction product of this invention in amounts of 0.001 to 1.0 wt. percent based on the total weight of the composition, to further improve the load-carrying ability of the oil composition.

The invention will be further understood by the following examples:

EXAMPLE I

One mole of silicon dimethyl dichloride was reacted for 16 hours at 45° C. with four moles of a 50/50 volume mixture of di($C_8$ Oxo) adipate and di($C_{10}$ Oxo) adipate. The di($C_8$ Oxo) adipate was prepared from isooctyl alcohol formed in the Oxo process from a $C_7$ olefin derived from a propylene-butylene feed, while the di($C_{10}$ Oxo) adipate was prepared from isodecyl alcohol formed in the Oxo process from a $C_9$ olefin derived from a tripropylene feed. The reaction mixture was next reduced in acidity to substantially neutral by washing with a 5 wt. percent aqueous solution of $Na_2CO_3$, followed by water washing, then repeating about four more times, filtering and finally heating to 120° C. to remove any remaining water.

EXAMPLE II

One mole of silicon tetrachloride was reacted with two moles of a 50/50 volume mixture of di($C_8$ Oxo) adipate and di($C_{10}$ Oxo) adipate for 5 hours at 45° C. The reaction product was neutralized by alkaline and water washing in the manner of Example I.

The reaction products of Examples I and II were next added in small amounts of two synthetic ester oil compositions. The first composition, hereinafter identified as A, had a base oil consisting of 45 vol. percent of di($C_8$ Oxo) adipate, 45 vol. percent di($C_{10}$ Oxo) adipate and 10 vol. percent of di(2-ethylhexyl) sebacate. The second synthetic ester oil composition, hereinafter identified as B, had as the base oil 95 vol. percent of di(2-ethylhexyl) sebacate and 5 vol. percent of a complex ester having the general formula: 2-ethylhexanol-[sebacic acid-polyethylene glycol (200 mol. wt.)]$_n$-sebacic acid-2-ethylhexanol where $n$ averaged about 2.

The above compositions were tested for load-carrying ability, either in the Ryder gear test in accordance with MIL–7808C specification procedures or in a modified SAE test. In the modified SAE test, the standard lubricant tester was used except that a gear ratio of 3.4 to 1 was used in place of the conventional ratio of 14.6 to 1. The test was carried out by running the machine for two minutes under a 50 lb. load, and then manually increasing the load 50 lbs. every ten seconds until scuffing occurred.

The compositions tested and the results obtained are summarized in the following table:

*Table 1*

| Base Oil | Percent Silicon Reaction Product | Modified SAE Test Load (lbs.) | Ryder Gear Test |
|---|---|---|---|
| | Unreacted 50/50 vol. mixture of di($C_8$ Oxo) adipate and di($C_{10}$ Oxo) adipate. | 400 | |
| | Reaction Product of Example I per se | 1,800 | |
| A[1] | None | | 1,900 |
| A | 3% reaction product of Example I | | 2,458 |
| A[1] | None | 450 | |
| A | 5 wt. percent of reaction product of Example I. | 700 | |
| A | 5 wt. percent of reaction product of Example II. | 700 | |
| B[2] | None | 550 | |
| B | 5 wt. percent reaction product of Example I. | 800 | |
| B | 5 wt. percent reaction product of Example II. | 800 | |

[1] Base oil A was 45% di($C_8$ Oxo) adipate, 45% di($C_{10}$ Oxo) adipate and 10% di(2-ethylhexyl) sebacate.
[2] Base oil B was 95% di-(2-ethylhexyl) sebacate and 5% complex ester.

As seen from Table I, a 50/50 mixture of the di($C_8$ Oxo) and di($C_{10}$ Oxo) adipates had a SAE load-carrying ability of 400 pounds. When reacted with silicon dimethyl dichloride, the load-carrying ability increased to 1800 pounds. While the reaction product per se is useful as a lubricant, it may also be blended in minor amounts with other ester lubricants as an additive as shown by the above table. The reaction product of the adipate mixture with silicon tetrachloride (Example II) gave similar results when blended with ester oil.

As a further illustration of this invention, Example I may be repeated, but using tri-phenyl silanol instead of the silicon dimethyl dichloride and eliminating the neutralizing, washing and drying steps.

In summary, the present invention relates to a silicon-containing synthetic oil having lubricating properties and particularly good load-carrying ability. This product is formed by the reaction of a synthetic ester of lubricating oil grade and a silicon material of the general formula $R_3SiX$, where X is halogen or a hydroxy group and each R may be the same as X or may be a hydrocarbon radical. By this reaction, the silicon material apparently adds on in some manner to the ester to introduce silicon into the ester to thereby improve its load-carrying ability. And at the same time, the resulting reaction product has substantially the original properties of the ester. Thus, by using a lubricating grade ester, a lubricating grade reaction product results. This reaction product per se may be used as a lubricant, or it may be admixed with other ester oils as a load-carrying additive.

The ester oils used either as base oils or as reactants may be diesters or complex esters. These esters may be more generically defined as saturated hydrocarbon groups and/or oxo-saturated hydrocarbon groups interlinked by at least two ester linkages and containing generally from 20 to 60 carbon atoms per molecule. Usually aliphatic, hydrocarbon groups are thusly linked, although recently some useful lubricating ester oils have been prepared from aromatic and alicyclic hydrocarbons. The most important esters, however, both in forming the reaction product and as a base oil for compositions containing the reaction product, are those diesters prepared from $C_6$ to $C_{10}$ dicarboxylic acids (i.e. alkandioic acids), and $C_7$ to $C_{13}$ alkanols.

What is claimed is:

1. A lubricating oil composition comprising a major proportion of a synthetic ester lubricating oil and a minor load-carrying improving amount of a substantially neutral, silicon-containing product of a synthetic ester lubricating oil reacted with a silicon material, wherein said synthetic ester is selected from the group consisting of alcohol diesters of saturated aliphatic dicarboxylic acids, complex esters formed by reaction of dicarboxylic acids with glycols and monohydric alcohols, and complex esters formed by reaction of dicarboxylic acids with glycols and with monocarboxylic acids, said diesters having a total of from 20 to 36 carbon atoms per molecule and said complex esters having a total of 20 to 60 carbon atoms per molecule, and wherein said silicon material has the general formula: $R_3SiX$, wherein X is selected from the group consisting of halogen and hydroxy groups and R is selected from the group consisting of X and $C_1$ to $C_{15}$ hydrocarbon radicals, said reaction between said synthetic ester oil and said silicon material being conducted at a temperature in the range of about 40° C. to 165° C. for from 1 to 16 hours, in the ratio of 0.5 to 20 moles of ester per mole of silicon material.

2. A lubricating oil composition according to claim 1 wherein said minor load-carrying improving amount is within the range of 0.5 to 10.0 wt. percent and said synthetic ester is a diester of a $C_6$ to $C_{10}$ dicarboxylic acid and a $C_7$ to $C_{13}$ alkanol, and X is chlorine.

3. A lubricating oil composition according to claim 1, wherein said silicon material is silicon tetrachloride.

4. A lubricating oil composition according to claim 1, wherein said silicon material is tri-phenyl silanol.

5. A lubricating oil composition according to claim 2, wherein said silicon material is silicon dimethyl dichloride.

6. A lubricating oil composition comprising a major proportion of a synthetic diester lubricating oil and 1 to 6 wt. percent, based on the weight of the total composition, of a substantially neutral, silicon-containing product of said synthetic diester reacted with a silicon material, said synthetic diester having the general formula:

$$ROOC—R_1COOR$$

where R is a $C_7$ to $C_{13}$ alkyl radical and $R_1$ is a $C_4$ to $C_8$ saturated aliphatic hydrocarbon radical, and said silicon material having the general formula:

$$R_3SiX$$

where X is chlorine and R is selected from the group consisting of chlorine and $C_1$ to $C_6$ alkyl groups, said product being obtained by reaction of from 0.5 to 20 moles of ester per mole of silicon material for from 1 to 16 hours at a temperature in the range of from about 40° to 165° C.

References Cited in the file of this patent
UNITED STATES PATENTS

| | | |
|---|---|---|
| 1,918,338 | Kaufmann | July 18, 1933 |
| 2,129,281 | Lincoln et al. | Sept. 6, 1938 |
| 2,270,352 | Sowa | Jan. 20, 1942 |
| 2,490,068 | Lincoln et al. | Dec. 6, 1949 |
| 2,528,535 | Merker | Nov. 7, 1950 |
| 2,535,239 | Sowa | Dec. 26, 1950 |
| 2,550,205 | Speier | Apr. 24, 1951 |
| 2,597,045 | Wilcock et al. | May 20, 1952 |
| 2,646,441 | Duane | July 21, 1953 |
| 2,907,783 | Kerschner et al. | Oct. 6, 1959 |
| 2,939,874 | Kirkland | June 7, 1960 |

OTHER REFERENCES

Christensen: "The Development of a Turbo-Prop Synthetic Lubricant," Lubrication Engineering, August 1952, pp. 177–200.

Atkins et al.: "Development of Additives and Lubricating Oil Compositions," I. & E. Chem., vol. 39, No. 4, April 1947, pp. 491–497.